United States Patent
Park et al.

(10) Patent No.: US 10,690,526 B2
(45) Date of Patent: Jun. 23, 2020

(54) APPARATUS AND METHOD FOR COMPENSATING A POSITION INFORMATION ERROR OF A RESOLVER

(71) Applicant: Hyundai Motor Company, Seoul (KR)

(72) Inventors: Joo Young Park, Seoul (KR); Hyung Bin Ihm, Seoul (KR); Byung Hoon Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 717 days.

(21) Appl. No.: 14/622,842

(22) Filed: Feb. 14, 2015

(65) Prior Publication Data
US 2016/0109269 A1 Apr. 21, 2016

(30) Foreign Application Priority Data

Oct. 20, 2014 (KR) .......................... 10-2014-0142095

(51) Int. Cl.
*G01D 18/00* (2006.01)
*G01D 5/20* (2006.01)
*G01D 5/244* (2006.01)

(52) U.S. Cl.
CPC .......... *G01D 18/002* (2013.01); *G01D 5/2046* (2013.01); *G01D 5/2449* (2013.01)

(58) Field of Classification Search
CPC ... G01D 5/2449; G01D 5/2046; G01D 18/002
See application file for complete search history.

(56) References Cited

U.S. PATENT DOCUMENTS

| | | | |
|---|---|---|---|
| 4,792,739 A | 12/1988 | Nakamura et al. | |
| 2004/0085039 A1 | 5/2004 | Games et al. | |
| 2006/0009936 A1 | 1/2006 | Moriarty et al. | |
| 2007/0201171 A1* | 8/2007 | Kanekawa | H03M 1/1004 361/42 |
| 2008/0120055 A1* | 5/2008 | Cheng | B60L 15/025 702/94 |
| 2010/0000815 A1 | 1/2010 | Tang et al. | |
| 2012/0143549 A1* | 6/2012 | Ihm | G01B 21/00 702/94 |

FOREIGN PATENT DOCUMENTS

| | | |
|---|---|---|
| CN | 88100070 A | 8/1988 |
| CN | 1719719 A | 1/2006 |

(Continued)

*Primary Examiner* — Vongsavanh Sengdara
(74) *Attorney, Agent, or Firm* — Mintz Levin Cohn Ferris Glovsky and Popeo, P.C.; Peter F. Corless (57) ABSTRACT

An apparatus for compensating for a position information error of a resolver includes: a resolver-digital converter configured to generate a corresponding output angle by estimating resolver position information from a resolver output signal; and a position error compensation learner configured to determine a position error component in a corresponding electric angular velocity of the resolver output signal using the resolver output signal and the output angle and to convert the position error component to a position error component in an electric angular velocity 0. The resolver-digital converter compensates for an error by reflecting the position error component in the electric angular velocity 0 in the error between a position angle of the resolver output signal and the output angle.

6 Claims, 3 Drawing Sheets

(56) References Cited

FOREIGN PATENT DOCUMENTS

| | | |
|---|---|---|
| CN | 101135573 A | 3/2008 |
| CN | 101535913 A | 9/2009 |
| CN | 102487265 A | 6/2012 |
| CN | 203587123 U | 5/2014 |
| JP | 2001-165707 A | 6/2001 |
| KR | 1995-0015930 | 6/1995 |
| KR | 10-0155746 B1 | 7/1998 |
| KR | 10-2009-0106996 A | 10/2009 |
| KR | 10-2009-0128167 A | 12/2009 |
| KR | 10-2012-0059956 A | 6/2012 |

* cited by examiner

APPARATUS AND METHOD FOR COMPENSATING A POSITION INFORMATION ERROR OF A RESOLVER

CROSS-REFERENCE TO RELATED APPLICATION

This application is based on and claims priority to Korean Patent Application No. 10-2014-0142095, filed on Oct. 20, 2014 in the Korean Intellectual Property Office, the disclosure of which is incorporated herein in its entirety by reference.

BACKGROUND

Technical Field

The present disclosure relates to an apparatus and method for compensating a position information error of a resolver, and more particularly, an apparatus and method for compensating a position information error of a resolver in order to solve a problem in which a position error changes for each velocity depending on an angle tracking observer (ATO) characteristic.

Description of the Related Art

Generally, for accurate velocity control of a motor, such as a permanent magnet synchronous motor (PMSM), etc., position information measured in a resolver (i.e., a rotor position sensor of a motor) is used. However, if the position information measured in the resolver has an error, compensation can be performed by using a recursive least squares (RLS) adaptive filter or the like. In general, in order to compensate for the position error of the resolver, conventional methods measure and compensate for the position error when the velocity of a motor is constant.

The resolver outputs a SIN signal and COS signal as position information of a motor rotor, the position information error of the resolver is generated by the transformation ratio difference of the resolver, an unbalanced excitation signal, a non-uniform inductance component, the distortion on a signal processing circuit, etc., and the error component of the position information is also periodically generated.

The error component of the position information of the resolver can be represented by a SIN or COS function having an arbitrary magnitude and phase. Here, t is time, and ω is an electric angular velocity of a signal.

POSITION ERROR $N$ ORDER COMPONENT=MAGNITUDE*cos($N\omega t$−PHASE)   Equation 1

Here, the reference dividing the order (N) of the position error component is 0~2π as 1 cycle based on an electric angle. As an example, when a quadrupolar motor is used, the position error of the resolver appears as the fourth order component of a mechanical angle. Since the mechanical angle of 90 degrees corresponds to the electric angle of 360 degrees, as an electric angle, it corresponds to the first order component.

However, schemes using a resolver to digital converter (RDC) chip chip or S/W converting the SIN, COS signals of the resolver to each of the information, have an angle tracking observer (ATO) for calculating each of the information inside the system. According to the characteristic of the ATO, the position error of the resolver varies depending on each velocity. In accordance with the design scheme and gain characteristic of the ATO, the frequency response characteristic of various ATOs can be implemented, and the frequency response characteristic of ATO varies depending on each velocity.

In fact, according to the inside ATO characteristic in a RDC chip implemented by H/W or a RDC function implemented by S/W, etc., the resolver positon error recognized by a microcomputer is differently recognized depending on each velocity. Thus, there is a problem in which the position error component measured in a particular velocity cannot be used for compensation in another velocity.

SUMMARY

Thus, in order to solve the above problems, the object of the present disclosure is to provide an apparatus and method for compensating for a position information error of a resolver, capable of providing accurate output angle information without compensating for the position error depending on each velocity for each of information digitally converted in a RDC chip, implemented by HW or a RDC function implemented by S/W, etc., by inputting a previously calculated position error compensation result to an ATO input. This is because the position error of the resolver varies depending on each velocity (e.g., signal angle velocity or rotor rotating velocity) according to the characteristic of ATO used for converting SIN, COS signals of the resolver to each of the information.

According to embodiments of the present disclosure, an apparatus for compensating for a position information error of a resolver includes: a resolver-digital converter configured to generate a corresponding output angle by estimating resolver position information from a resolver output signal; and a position error compensation learner configured to determine a position error component in a corresponding electric angular velocity of the resolver output signal using the resolver output signal and the output angle and to convert the position error component to a position error component in an electric angular velocity 0, wherein the resolver-digital converter compensates for an error by reflecting the position error component in the electric angular velocity 0 in the error between a position angle of the resolver output signal and the output angle.

The apparatus may eliminate the error by converting an amplitude and a phase of the position error component of the resolver output signal to the position error component in the electric angular velocity 0, based on a value of the electric angular velocity, and reflecting the position error component in the electric angular velocity 0 in the resolver-digital converter.

The position error compensation learner may be further configured to perform the conversion of the position error component using a mapping table in which predetermined mapping data for the resolver output signal based on the electric angular velocity is stored.

The mapping data may include an amplitude ratio and a phase difference of the resolver output signal based on the electric angular velocity in the electric angular velocity 0.

The position error compensation learner may be further configured to perform the conversion of the position error component using an amplitude ratio and a phase difference of the resolver output signal in a corresponding electric angular velocity in the electric angular velocity 0 calculated according to an interpretation of a frequency response characteristic of an angle tracking observer (ATO).

The position error compensation learner may include: an angular velocity determiner configured to determine the electric angular velocity of the resolver output signal; a position error determiner configured to determine an N-order position error component including an amplitude and a phase in the electric angular velocity, wherein N is 0 or a positive real number; and a position error converting calculator configured to calculate the N-order position error component as an amplitude and a phase corresponding to an N-order position error in the electric angular velocity 0.

The position error converting calculator may be further configured to convert an amplitude $M_{N@EAV}$ and a phase $\Phi_{N@EAV}$ of the N-order position error component to an amplitude $M_{N@ELECTRIC\ ANGULAR\ VELOCITY\ 0}$ and a phase $\Phi_{N@ELECTRIC\ ANGULAR\ VELOCITY\ 0}$ corresponding to the N-order position error in the electric angular velocity 0 by using the following equation:

$$M_{N@ELECTRIC\ ANGULAR\ VELOCITY0} = \frac{M_{N@EAV}}{ATO\text{-}AR_{N@EAV}}$$

$$\Phi_{N@ELECTRIC\ ANGULAR\ VELOCITY\ 0} = \Phi_{N@EAV} - ATO\text{-}PD_{N@EAV}$$

wherein, $ATO\text{-}AR_{N@EAV}$ is an amplitude ratio of the resolver output signal in a corresponding electric angular velocity for the electric angular velocity 0, and $ATO\text{-}PD_{N@EAV}$ is a phase difference of the resolver output signal in a corresponding electric angular velocity for the electric angular velocity 0.

The resolver-digital converter may include: a position error converter configured to generate an N-order position error component in the electric angular velocity 0 for the output angle, wherein N is 0 or a positive real number; and an ATO configured to generate the output angle for which the error is compensated by calculating the error between the position angle of the resolver output signal and the output angle and subtracting the N-order position error component in the electric angular velocity 0 from the error.

The position error converter may be further configured to output the N-order position error components in the electric angular velocity 0 by a repetition learning operation of the position error learner, and the ATO may be further configured to generate the output angle in which a sum value of all N-order position error components is subtracted from the error.

Furthermore, according to embodiments of the present disclosure, a method for compensating for a position information error of a resolver includes: generating a corresponding output angle by estimating resolver position information from a resolver output signal; determining a position error component in a corresponding electric angular velocity of the resolver output signal using the resolver output signal and the output angle; converting the position error component to a position error component in an electric angular velocity 0; and compensating for an error by reflecting the position error component in the electric angular velocity 0 in the error between a position angle of the resolver output signal and the output angle.

The method may further include: eliminating the error by converting an amplitude and a phase of the position error component of the resolver output signal to the position error component in the electric angular velocity 0, based on a value of the electric angular velocity; and reflecting the position error component in the electric angular velocity 0.

The converting of the position error component may include: performing the conversion of the position error component using a mapping table in which predetermined mapping data for the resolver output signal depending on the electric angular velocity is stored.

The mapping data may include an amplitude ratio and a phase difference of the resolver output signal based on the electric angular velocity in the electric angular velocity 0.

The converting of the position error component may include: performing the conversion of the position error component using an amplitude ratio and a phase difference of the resolver output signal in a corresponding electric angular velocity in the electric angular velocity 0 calculated according to an interpretation of a frequency response characteristic of an angle tracking observer (ATO).

The converting of the position error component may include: determining the electric angular velocity of the resolver output signal; determining an N-order position error component including an amplitude and a phase in the electric angular velocity, wherein N is 0 or a positive real number; and calculating the N-order position error component as an amplitude and a phase corresponding to an N-order position error in the electric angular velocity 0.

The calculating of the N-order position error component may include: converting an amplitude $M_{N@EAV}$ and a phase $\Phi_{N@EAV}$ of the N-order position error component to an amplitude $M_{N@ELECTRIC\ ANGULAR\ VELOCITY\ 0}$ and a phase $\Phi_{N@ELECTRIC\ ANGULAR\ VELOCITY\ 0}$ corresponding to the N-order position error in the electric angular velocity 0 by using the following equation:

$$M_{N@ELECTRIC\ ANGULAR\ VELOCITY0} = \frac{M_{N@EAV}}{ATO\text{-}AR_{N@EAV}}$$

$$\Phi_{N@ELECTRIC\ ANGULAR\ VELOCITY\ 0} = \Phi_{N@EAV} - ATO\text{-}PD_{N@EAV}$$

wherein, $ATO\text{-}AR_{N@EAV}$ is an amplitude ratio of the resolver output signal in a corresponding electric angular velocity for the electric angular velocity 0, and $ATO\text{-}PD_{N@EAV}$ is a phase difference of the resolver output signal in a corresponding electric angular velocity for the electric angular velocity 0.

The compensating for the error may include: generating an N-order position error component in the electric angular velocity 0 for the output angle, wherein N is 0 or a positive real number; and generating the output angle for which the error is compensated by calculating the error between the position angle of the resolver output signal and the output angle and subtracting the N-order position error component in the electric angular velocity 0 from the error.

The method may further include: outputting the N-order position error components in the electric angular velocity 0 by a repetition learning operation of the position error learner; and generating the output angle in which a sum value of all N-order position error components is subtracted from the error.

Furthermore, according to embodiments of the present application, a non-transitory computer readable medium containing program instructions for compensating for a position information error of a resolver includes: program instructions that generate a corresponding output angle by estimating resolver position information from a resolver output signal; program instructions that determine a position error component in a corresponding electric angular velocity of the resolver output signal using the resolver output signal and the output angle; program instructions that convert the position error component to a position error component in an electric angular velocity 0; and program instructions that compensate for an error by reflecting the position error component in the electric angular velocity 0 in the error between a position angle of the resolver output signal and the output angle.

Accordingly, the apparatus, method, and computer readable medium for compensating for a position information error of a resolver according to the present disclosure can provide accurate output angle information without compensating for the position error based on each velocity for each of information digitally converted in a RDC chip implemented by HW or a RDC function implemented by S/W, etc., by inputting a previously calculated position error compensation result to an ATO input.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Hereinafter, the present disclosure will be described in detail with reference to the drawings. At this time, in each of the drawings, the same components are denoted by the same reference symbols, if possible. Further, detailed descriptions for the previously known features and/or configurations are omitted. In the description below, parts required to understand operations in accordance with various embodiments will be explained in priority, the descriptions for elements, which may obscure the gist of the descriptions, are omitted. It can also be shown schematically some of the elements in the figures are exaggerated or omitted. Not utterly reflect an actual size of each element, so that they are not intended to limit the content that is specified here by the relative size and spacing of the elements drawn in the figure, respectively.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
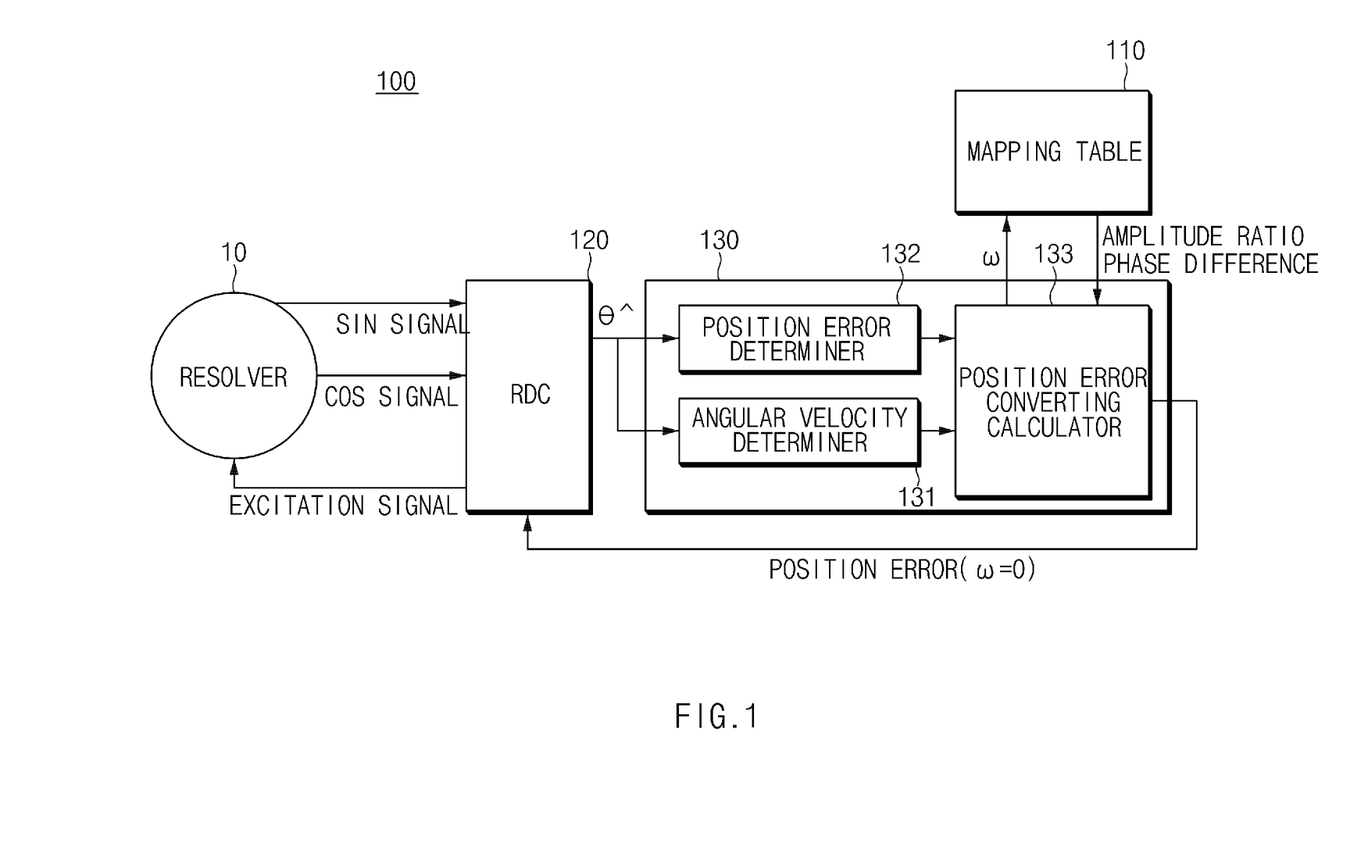
FIG. 1 is a diagram for explaining an apparatus for compensating a position information error of a resolver according to embodiments of the present disclosure.

Referring now to the disclosed embodiments, FIG. 1 is a diagram for explaining an apparatus 100 for compensating a position information error of a resolver 10 according to embodiments of the present disclosure. As shown in FIG. 1, an apparatus 100 for compensating a position information error of a resolver 10 includes a mapping table 110, a resolver-digital converter (RDC, Resolver to Digital Converter) 120 and a position error compensation learner 130.

When an analog excitation signal (e.g., K sin ωt) is applied from the resolver-digital converter 120, the resolver 10 generates a sin signal (e.g., K cos θ sin ωt) and cos signal (e.g., K sin θ cos ωt) depending on the rotor position of a motor such a permanent magnet synchronous motor (PMSM), etc., and from this, the resolver-digital converter 120 can calculate resolver position information, that is, rotor angle information θ^. The velocity of a motor's rotor can vary depending on an electric angular velocity ω and a predetermined processor can perform the position control of the motor's rotor, etc. based on the position information θ^.

As the above described, the position error in the output signal of the resolver 10 which is operating for the position information θ^ estimated by the resolver-digital converter 120 can be composed of various order components and can be measured by various methods. However, the position error component for the overall order (N) of the position error component, measured regardless of the position error measurement method as in the present disclosure, can be represented by the equation such as the Equation 2 with respect to the electric angular velocity ω.

POSITION ERROR COMPONENT = [Equation 2]
$$\sum_{0}^{\infty} M_N \cos(N\omega t - \Phi_N)$$

Here, N is the order of the position error component, t is time, ω is the electrical angular velocity, $M_N$ is the magnitude of the amplitude of the N order position error component and $\Phi_N$ is the phase of the N order position error component. The order N may be not only an integer but also a real number according to the position error component. For example, in a hexapolar motor, when the position error of the fourth order mechanical angle exists, 4/6th order component can be generated in the output signal of the resolver 10. The amplitude $M_N$ and the phase $\Phi_N$ are the components which vary according to the electric angular velocity ω depending on the designed characteristic of angle tracking observer (ATO) (e.g., see 121 of FIG. 2).

In the present disclosure, by compensating for the amplitude $M_N$ and the phase $\Phi_N$ varied based on the electric angular velocity ω value based on the N-order position error component previously measured in a particular electric angular velocity $\omega_{target}$, the position error in the overall velocity (e.g., signal angular velocity or rotor rotating velocity) area can be corrected.

The amplitude $M_N$ and the phase $\Phi_N$ of the N-order position error in a particular electric angular velocity $\omega_{target}$ varied based on the electric angular velocity $\omega$ can be calculated from the frequency response characteristic of the ATO to be used, which can be obtained by the interpretation of Bode diagram, etc. based on ATO structure and its gain, it can be obtained by a previous measurement, and it can be stored and managed in a storage means as a mapping table form. That is, in the mapping table 110 stored and managed in the storage means such as a memory, database, etc., previously, by the reference of the electric angular velocity 0, the mapping data for the ATO amplitude ratio and ATO phase difference for the N-order position error in the targeted corresponding particular electric angular velocity $\omega_{target}$ are previously calculated or measured and prepared (e.g., see S110 of FIG. 3). Instead of the electric angular velocity $\omega_{target}$, by using a frequency (Hz units), the mapping data for the ATO amplitude ratio and the ATO phase difference corresponding to it may be used. The ATO amplitude ratio and the ATO phase difference, which is the amplitude ratio and the phase difference for each electric velocity previously converted for the electric angular velocity 0, will be represented as ATO-$AR_{N@EAV}$, ATO-$PD_{N@EAV}$ as described in the following.

In FIG. 1, the position error compensation learner 130 includes an angular velocity determiner 131, position error determiner 132 and a position error converting calculator 133. In order to use the mapping table 110, first, based on the output signal of the resolver 10 which is operating and the position information $\hat{\theta}$ estimated by the resolver-digital converter 120, the angular velocity determiner 131 determines the current particular electric angular velocity $\omega_{target}$, and the position error determiner 132 may determine the N-order position error component (e.g., amplitude and phase) in a particular electric angular velocity $\omega_{target}$ (e.g., see S120 of FIG. 3). The N-order position error component may be represented as Equation 3. Here, $M_{N@EAV}$, $\Phi_{N@EAV}$ is the amplitude and the phase of the N-order position error component in a particular electric angular velocity $\omega_{target}$.

$$M_{N@EAV}\cos(N\omega_{target}t - \Phi_{N@EAV}) \quad \text{[Equation 3]}$$

By referring to the mapping table 110, the position error converting calculator 133 converts the amplitude and the phase $M_{N@EAV}$, $\Phi_{N@EAV}$ of the above determined electric angular velocity $\omega_{target}$ and the N-order position error component to the N-order position error component in the electric angular velocity 0, that is, the amplitude and the phase ($M_{N@ELECTRIC\ ANGULAR\ VELOCITY\ 0}$, $\Phi_{N@ELECTRIC\ ANGULAR\ VELOCITY\ 0}$) as Equation 4 (S130). Also, the position error converting calculator 133 can perform the above converting by calculating the amplitude ratio and the phase difference of the resolver output signal in the corresponding electric angular velocity for the electric angular velocity 0 from the interpretation of the frequency response characteristic of the ATO to be used as the above described without using the mapping table 110.

$$M_{N@ELECTRIC\ ANGULAR\ VELOCITY\ 0} = \frac{M_{N@EAV}}{ATO\text{-}AR_{N@EAV}} \quad \text{[Equaton 4]}$$

$$\phi_{N@ELECTRIC\ ANGULAR\ VELOCITY\ 0} = \phi_{N@EAV} - ATO\text{-}PD_{N@EAV}$$

Like this, the N-order position error component in the electric angular velocity 0 calculated by the position error converting calculator 133 means the N-order position error component of the resolver 10 and other circuits before passing the ATO 121.

The N-order position error component in the electric angular velocity 0 calculated by the position error converting calculator 133 is stored in a predetermined storage means such as a memory, etc., it is consistently learned, updated and managed by the operation of the position error compensation learner 130, and the data for the stored N-order position error component transmitted to the resolver-digital converter (RDC) 120 so that the position error in the overall velocity area can be corrected.

Figure 2:
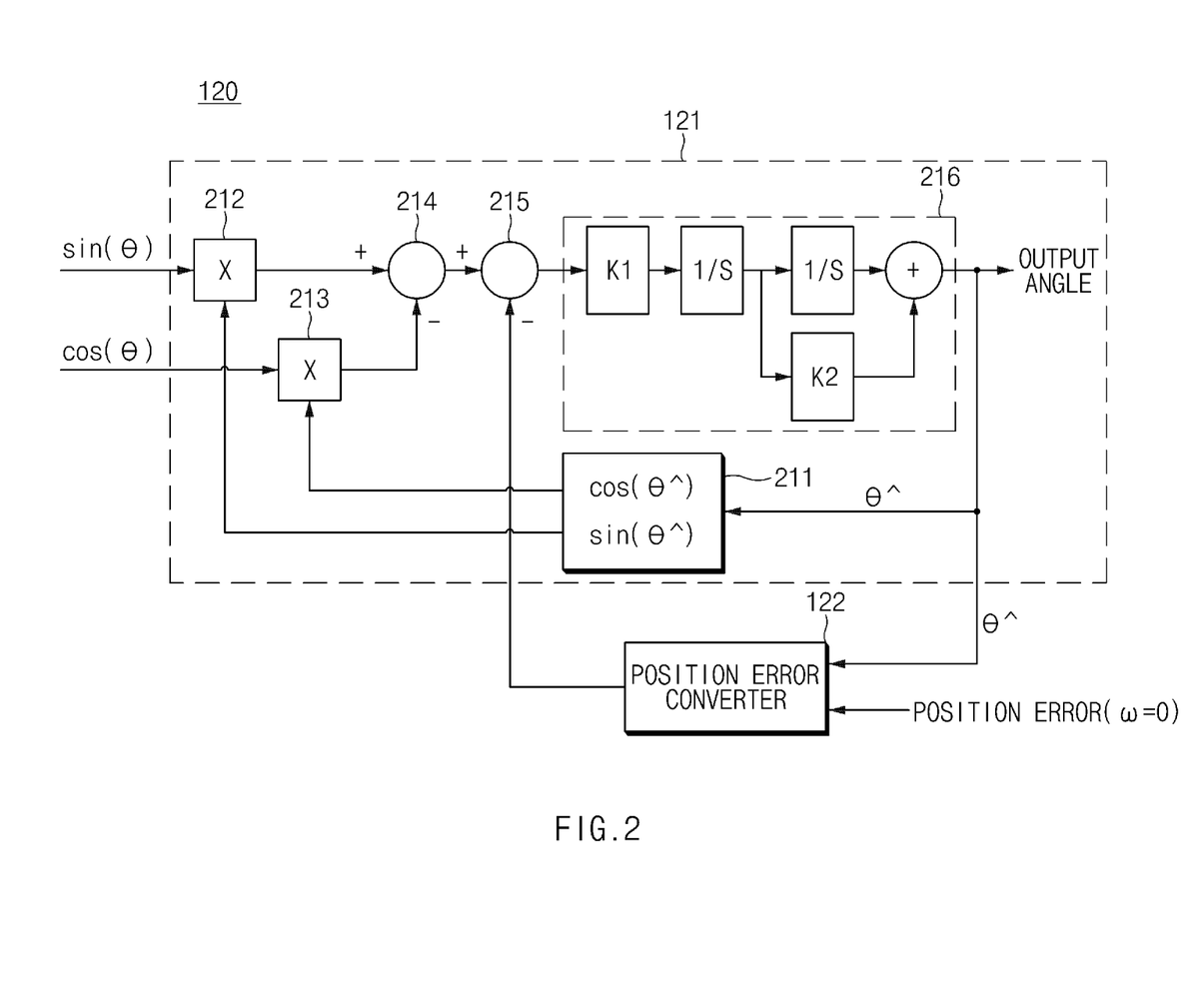
FIG. 2 is a specific block diagram of Resolver-Digital Converter (RDC) of FIG. 1.

FIG. 2 is a specific block diagram of Resolver-Digital Converter (RDC) 120 of FIG. 1. As shown in FIG. 2, the RDC 120 includes an ATO 121 and a position error converter 122.

The ATO 121 may calculate the angle information $\hat{\theta}$ from the SIN signal and COS signal which is the output signal (angle information=$\theta$) of the resolver 10. The ATO 121 receives the feedback of the output angle $\hat{\theta}$ and corrects the output angle $\hat{\theta}$ so as to minimize the error between the position angle $\theta$ and the output angle $\hat{\theta}$ of the output signal of the resolver 10 inputted as Equation 5.

$$\sin(\theta)*\cos(\hat{\theta}) - \cos(\theta)*\sin(\hat{\theta}) = \sin(\theta-\hat{\theta}) \approx \theta-\hat{\theta} \quad \text{[Equation 5]}$$

Figure 3:
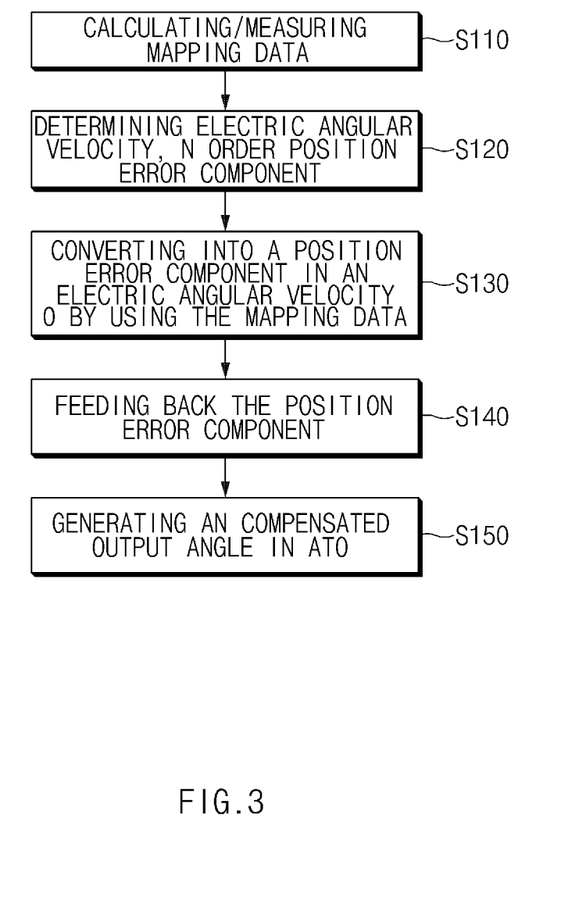
FIG. 3 is a flow chart for explaining the operation of an apparatus for compensating for a position information error of a resolver according to embodiments of the present disclosure.

Further, in the present disclosure, the position error converter 122 receives the N-order position error component ($M_{N@ELECTRIC\ ANGULAR\ VELOCITY\ 0}$, $\Phi_{N@ELECTRIC\ ANGULAR\ VELOCITY\ 0}$) in the electric angular velocity 0 for the output angle $\hat{\theta}$ from the position error converting calculator 133 and feeds back into the ATO 121 (e.g., see S140 of FIG. 3). If the output angle $\hat{\theta}$ of the ATO 121 is converged, since $\theta = \hat{\theta}$, calculating the N order position errors for the position angle $\theta$ of the output signal of the resolver 10 is also fine. According to the repetition learning operation of the position error compensating learner 130, the position error converter 122 can calculate the N-order position error components in the electric angle velocity 0 as Equation 6, and the overall N (N is 0 or a positive real number possible) order position error components in the electric angular velocity 0 for the output angle $\hat{\theta}$ of the ATO 121 are summed and fed back into the ATO 121.

$$\sum_{N=0} M_{M_{N@ELECTRIC\ ANGULAR\ VELOCITY 0}} \quad \text{[Equation 6]}$$

$$\cos(\hat{\theta} - \phi_{M_{N@ELECTRIC\ ANGULAR\ VELOCITY 0}})$$

If the ATO 121 receives the N-order position error component in the electric angular velocity 0 from the position error converter 122, as Equation 7, the ATO 121 calculates the error $\theta - \hat{\theta}$ between the position angle $\theta$ of the output signal of the resolver 10 and the output angle $\hat{\theta}$ of the ATO 121 and enables the corresponding error to be eliminated by the position error of Equation 6 so that the output angle $\theta = \hat{\theta}$ compensated without any error can be outputted (e.g., see S150 of FIG. 3).

$$\theta - \hat{\theta} - \sum_{N=0} M_{M_{N@ELECTRIC\ ANGULAR\ VELOCITY 0}} \quad \text{[Equation 7]}$$

$$\cos(\hat{\theta} - \phi_{M_{N@ELECTRIC\ ANGULAR\ VELOCITY 0}})$$

For example, the SIN signal and COS signal of the resolver 10 are synthesized with the SIN signal sin θ^ and the COS signal cos θ^ for the output angle θ^ from a signal generator 211 in the synthesizers 212, 213, respectively, and the synthesized signals are subtracted in a subtractor 214. The output of subtractor 214 is subtracted with the N order position error component in the electric angular velocity 0 from the position error converter 122 in a subtractor 215 again. Accordingly, the output angle θ-θ^ compensated without any error can be outputted by the proportional integration control, etc. using an integrator 1/S and a proportioner K* of a controller 216 for the output of the subtractor 215.

In general, the position error of the resolver 10 may be different according to the characteristic of the ATO 121, but, as in the present disclosure, in the ATO 121, it is converted and reflected to the position error in the electric angular velocity 0 and is compensated for to eliminate the position error, so that the compensation of the position error is possible regardless of the characteristic of ATO.

The above components or functions, etc. of the apparatus 100 for compensating a position information error of a resolver 10 can be implemented in hardware, software, or a combination thereof. Furthermore, if the above components and the functions according to embodiments of the present disclosure are executed by one or more computers or (semi-conductor) processors, it can be implemented as codes readable by a computer or processor on a recording medium readable by a computer or processor.

In the above description, the present disclosure has been described through specific elements, embodiments, and drawings, it is only provided to assist in a comprehensive understanding of the present disclosure, the present disclosure is not limited to the embodiments, and it will be understood by those skilled in the art that the present disclosure may be implemented as various modifications and variations without departing from the spirit of the present disclosure. Accordingly, the scope of the present disclosure is recited in the appended claims, not the above descriptions, and all differences within the equivalent scope of the present disclosure will be construed as being included in the present disclosure.

What is claimed is:

1. An apparatus for compensating for an error in position information of a resolver comprising:
    a mapping table storing predetermined mapping data for each of a plurality of resolver output signals according to a corresponding electric angular velocity;
    a resolver-digital converter configured to generate a corresponding output angle by determining resolver position information from a resolver output signal of the plurality of resolver output signals;
    a position error determiner configured to determine a position error component in a corresponding electric angular velocity of the resolver output signal using a resolver output signal of the plurality of output resolver signals and the corresponding output angle and to convert the position error component to a position error component in the electric angular velocity, wherein the electric angular velocity is zero, based on the mapping table; and
    a processor configured to adjust a position or a velocity of a rotor of a motor based on the resolver position information and the position error component converted to the position error component in the electric angular velocity which is zero,
    wherein the resolver-digital converter compensates for an error by applying the position error component, converted to the position error component in the electric angular velocity, wherein the electric angular velocity is zero, in the error between a position angle of the resolver output signal of the plurality of output resolver signals and the corresponding output angle,
    wherein the position error determiner comprises:
        an angular velocity determiner configured to determine the electric angular velocity of the resolver output signal;
        a position error determiner configured to determine an N-order position error component including an amplitude and a phase in the electric angular velocity, wherein N is equal to or greater than zero; and
        a position error converting calculator configured to calculate the N-order position error component as an amplitude and a phase corresponding to an N-order position error in the electric angular velocity which is zero, and
    wherein the position error converting calculator is further configured to convert an amplitude $M_{N@EAV}$ and a phase $\Phi_{N@EAV}$ of the N-order position error component to an amplitude $M_{N@ELECTRIC\ ANGULAR\ VELOCITY\ 0}$ and a phase $\Phi_{N@ELECTRIC\ ANGULAR\ VELOCITY\ 0}$ corresponding to the N-order position error in the electric angular velocity which is zero by using the following equation:

$$M_{N@ELECTRIC\ ANGULAR\ VELOCITY\ 0} = \frac{M_{N@EAV}}{ATO\text{-}AR_{N@EAV}}$$

$$\emptyset_{N@ELECTRIC\ ANGULAR\ VELOCITY\ 0} = \emptyset_{N@EAV} - ATO\text{-}PD_{N@EAV}$$

wherein, $ATO\text{-}AR_{N@EAV}$ is an amplitude ratio of the resolver output signal in a corresponding electric angular velocity for the electric angular velocity which is zero, and $ATO\text{-}PD_{N@EAV}$ is a phase difference of the resolver output signal in a corresponding electric angular velocity for the electric angular velocity which is zero.

2. The apparatus for compensating for an error in position information of a resolver according to claim 1, wherein the apparatus eliminates the error between the position angle of the resolver output signal of the plurality of output resolver signals and the corresponding output angle by converting an amplitude and a phase of the position error component of the resolver output signal to the position error component in the electric angular velocity, which is zero, based on a value of the electric angular velocity, and applying the position error component in the electric angular velocity which is zero in the resolver-digital converter.

3. The apparatus for compensating for an error in position information of a resolver according to claim 1, wherein the mapping data includes an amplitude ratio and a phase difference of each of the resolver output signals based on the corresponding electric angular velocity in the electric angular velocity which is zero.

4. The apparatus for compensating for an error in position information of a resolver according to claim 1, wherein the position error determiner is further configured to perform the conversion of the position error component using an amplitude ratio and a phase difference of the resolver output signal of the plurality of resolver output signals in a corresponding electric angular velocity in the electric angular velocity, which is zero, calculated according to an interpretation of a frequency response characteristic of an angle tracking observer (ATO).

5. The apparatus for compensating for an error in position information of a resolver according to claim 1, wherein the resolver-digital converter comprises:
 a position error converter configured to generate an N-order position error component in the electric angular velocity, which is zero, for the output angle, wherein N is equal to or greater than zero; and
 an ATO configured to generate the output angle for which the error is compensated by calculating the error between the position angle of the resolver output signal of the plurality of resolver output signals and the corresponding output angle and subtracting the N-order position error component in the electric angular velocity, which is zero, from the error.

6. The apparatus for compensating for an error in position information of a resolver according to claim 5, wherein the position error converter is further configured to output the N-order position error components in the electric angular velocity, which is zero, by a repetition detection of the position error determiner, and the ATO is further configured to generate the output angle in which a sum value of all N-order position error components is subtracted from the error.

* * * * *